Dec. 13, 1955  E. V. HORNER  2,726,634
PAINTER'S TIRE COVER MASK
Filed July 15, 1954
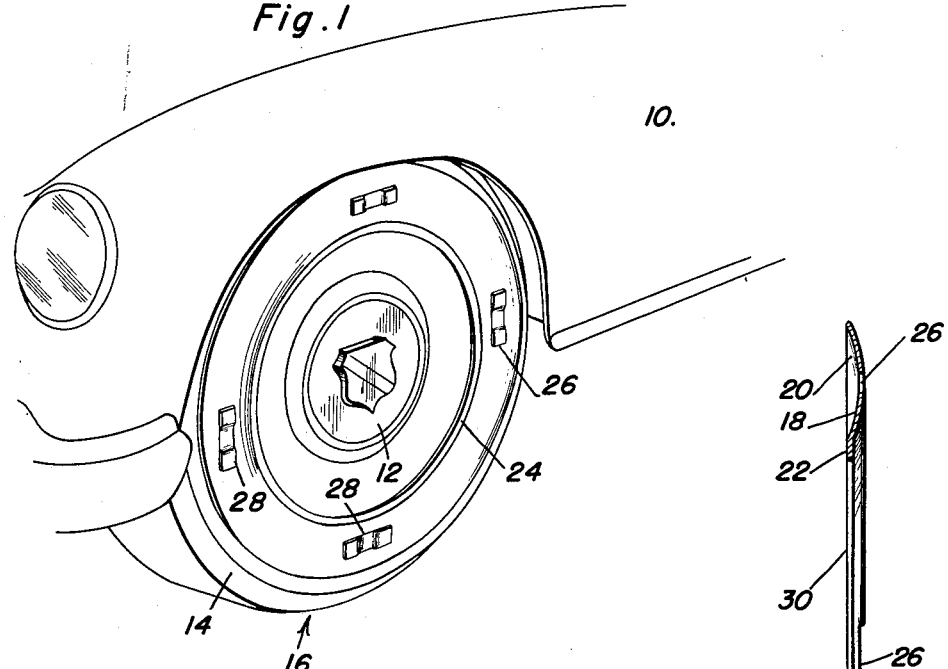
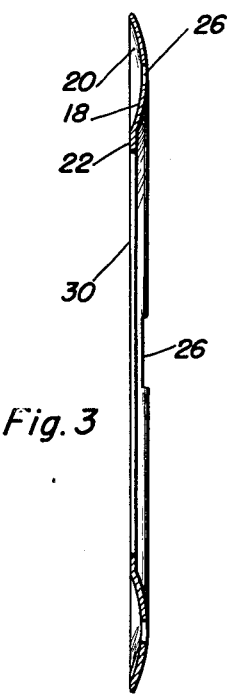
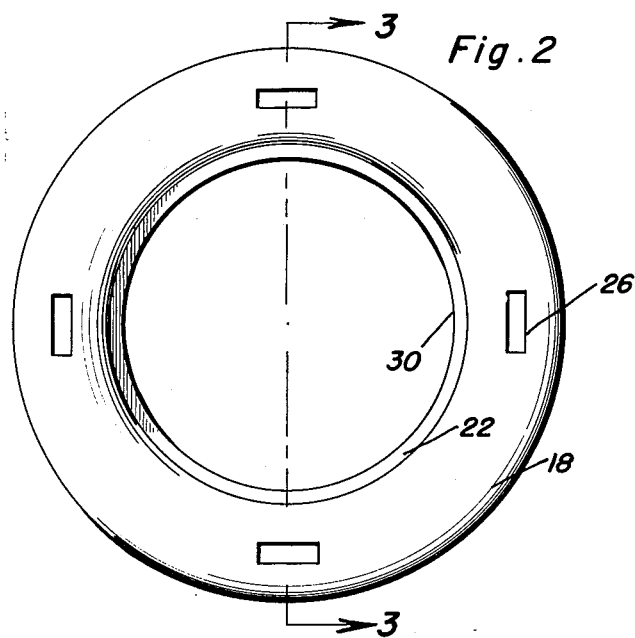
Earl V. Horner
INVENTOR.

United States Patent Office 2,726,634
Patented Dec. 13, 1955

2,726,634

PAINTER'S TIRE COVER MASK

Earl V. Horner, Warwick, Va.

Application July 15, 1954, Serial No. 443,526

1 Claim. (Cl. 118—505)

This invention relates to a masking device for use in the painting of automobile bodies and wheels and has for its particular object the provision of means for simply and efficiently masking the tires mounted on the wheels of an automobile or like vehicle during painting operation.

A further object of the invention resides in the provision of a painter's tire cover which can be easily attached and detached from the wheel of a vehicle and which will firmly mask the tire so as to eliminate the necessity of cleaning paint from the tire after the painting operation.

The construction of this invention features the utilization of a ring having a plurality of apertures therethrough. Secured to the ring and overlying the apertures to close the apertures is an adhesively coated tape which extends through the apertures to hold the ring in overlying relationship relative to the tire thereof.

Still further objects and features of this invention reside in the provision of a painter's tire cover that is simple in construction, capable of being manufactured from any and various readily available material, and which is inexpensive to produce thereby permitting wide distribution in the automotive trade.

These, together with the various ancillary objects and features of the invention which will become apparent as the following description proceeds, are attained by this painter's tire cover, a preferred embodiment of which has been illustrated in the accompanying drawings, by way of example only, wherein:

Figure 1 is a perspective view illustrating the manner in which the invention is mounted on an automobile wheel;

Figure 2 is a side elevational view of the painter's tire cover; and

Figure 3 is a vertical sectional view as taken along the plane of line 3—3 in Figure 2.

With continuing reference to the accompanying drawings wherein like reference numerals designate similar parts throughout the various views, reference numeral 10 generally designates any conventional vehicle which is provided with a wheel 12 having a pneumatic tire 14, or the like, mounted thereon. When it is necessary to repair or to paint the vehicle 10 or the wheel 12, it is highly desirable to mask the tire 14 to prevent the tire 14 from becoming covered with paint which would detract from the appearance of the vehicle as a whole. Therefore, it is customary to either mask the tire 14 utilizing paper, or the like, which may be attached by any convenient means to the tire 14. However, this masking is usually unsatisfactory and requires an extensive period of time to be adequately accomplished. The painter's tire cover which comprises the present invention and is generally indicated by reference numeral 16 is adapted to reduce the time necessary for the masking of the tire 14 and to eliminate the necessity of cleansing the paint from the tire 14.

The painter's tire cover 16 comprises a ring 18 formed of any suitable material such as metal, plastics, glass or wood products, papers, or the like, or any other convenient material. The ring 18 is preferably formed with a concave inner surface 20 conforming to the contours of the tire 14 and is provided with an integrally formed flange 22 which is adapted to abut against the rim 24 of the wheel 12.

A plurality of substantially rectangular apertures 26 are formed in the ring 18 and are preferably equally spaced from each other. Secured in overlying relationship relative to the apertures 26 and adapted to extend through the apertures 26 are strips of tape 28 or any other suitable and like substance which is adhesively coated so as to not only bond with the ring 18 but to adhesively engage the tire 14 to secure the ring 18 to the tire 14. Since the tape 28 completely overlies the apertures 26 no paint can pass therethrough and accordingly the side walls of the tire 14 will thus be completely masked during painting operations. It is, of course, an easy job to apply or detach the ring 18 from the tire 14. Further, because the ring 14 has an enlarged central aperture 30 the wheel 24 can be painted at the same time that the vehicle 10 is painted.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitably modifications and equivalents may be resorted to, falling within the scope of the appended claim.

What is claimed as new is as follows:

A masking device for an automobile tire mounted on a wheel comprising a ring having a central aperture, said ring being adapted to overlie an automobile tire, a plurality of apertures through said ring, and strips of adhesive coated material secured to said ring and overlying said apertures, said strips extending through said apertures and adapted to adhesively engage a tire to secure said ring on an automobile wheel, said ring having an external diameter less than that of a tire and being inwardly concave to conform to and fit closely against the side wall of an automobile tire, said ring being formed with an inner vertical circumferential flange of a diameter to abut against the rim of an automobile wheel.

References Cited in the file of this patent

UNITED STATES PATENTS

| | | |
|---|---|---|
| 1,424,199 | Humelban | Aug. 1, 1922 |
| 1,701,627 | Pearsall | Feb. 12, 1929 |
| 1,846,266 | Lyon | Feb. 23, 1932 |
| 2,210,233 | De Lillo | Aug. 6, 1940 |
| 2,634,704 | Morrison | Apr. 14, 1953 |